(12) United States Patent
Miki

(10) Patent No.: US 7,336,874 B2
(45) Date of Patent: Feb. 26, 2008

(54) DISPLAY ELEMENT AND DISPLAY DEVICE

(75) Inventor: Yuichiro Miki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 10/810,269

(22) Filed: Mar. 26, 2004

(65) Prior Publication Data

US 2004/0245915 A1  Dec. 9, 2004

(30) Foreign Application Priority Data

Mar. 28, 2003  (JP)  ............... 2003-091113

(51) Int. Cl.
*G02B 6/04* (2006.01)
*G09G 3/18* (2006.01)
*H01J 1/62* (2006.01)
*G02F 1/1333* (2006.01)

(52) U.S. Cl. ............... 385/115; 385/116; 385/901; 345/50; 313/495; 349/56

(58) Field of Classification Search .......... 385/115, 385/116, 119, 147, 901; 313/495, 483, 500, 313/505, 511, 513; 345/55, 76, 84, 50, 94; 349/56, 61, 74
See application file for complete search history.

(56) References Cited

U.S. PATENT DOCUMENTS

| | | | | |
|---|---|---|---|---|
| 5,962,967 A | * | 10/1999 | Kiryuschev et al. | ........ 313/491 |
| 6,072,619 A | * | 6/2000 | Kiryuschev et al. | ........ 359/245 |
| 6,697,191 B2 | * | 2/2004 | Kiryuschev et al. | ........ 359/345 |
| 2002/0050784 A1 | | 5/2002 | Shuichi | ........ 313/495 |
| 2002/0187697 A1 | * | 12/2002 | Kiryuschev et al. | ........ 442/181 |
| 2004/0245915 A1 | * | 12/2004 | Miki | ........ 313/495 |

FOREIGN PATENT DOCUMENTS

| | | |
|---|---|---|
| JP | H01-034794 A | 3/1989 |
| JP | 2810742 | 11/1990 |
| JP | H02-280119 A | 11/1990 |
| JP | 11-202804 | 7/1999 |
| JP | 2002-28174 | 3/2002 |
| JP | 2002-040489 | 6/2002 |

* cited by examiner

*Primary Examiner*—Brian M. Healy
(74) *Attorney, Agent, or Firm*—Morgan & Finnegan, LLP

(57) ABSTRACT

A display device is constructed with conductive fibers which are coated with a display medium and are woven together with transparent conductive fibers. The conductive fibers coated with a display medium serve as warps and the transparent conductive fibers serve as wefts. The display device is not provided with an external electrode and is therefore flexible like plain cloth.

9 Claims, 4 Drawing Sheets

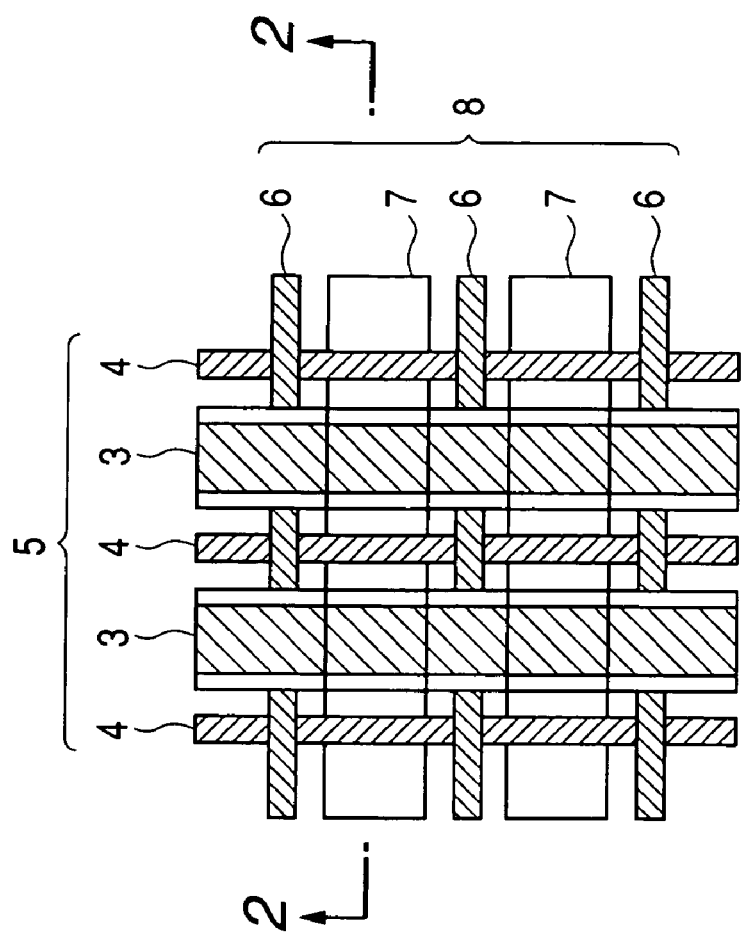
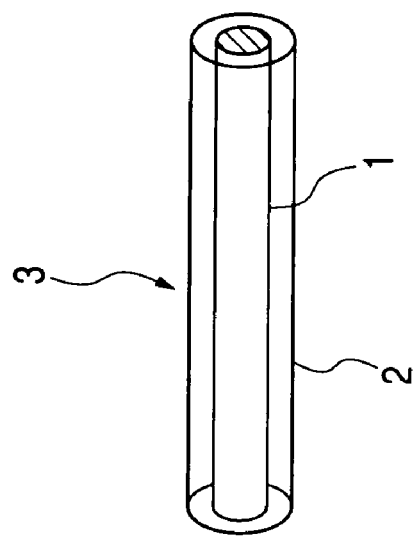
FIG. 1A
FIG. 1B

DISPLAY ELEMENT AND DISPLAY DEVICE

BACKGROUND OF THE INVENTION

1. Field of the Invention

The present invention relates to a display device which can be used for information instruments such as a television or a personal computer, mobile terminals such as a mobile telephone or a digital book, and also cloth products such as clothes or a curtain.

2. Related Background Art

As a flexible sheet-shaped display device, there has been proposed a display device comprising display elements are embedded in fibers which are arranged in a sheet form. FIG. 5 shows a sheet-shaped display device proposed in US 2002/0050784 A1. The display device is composed of a plurality of display units. Each of the display units comprises columnar display elements 51 enclosed and sealed in a transparent hollow tube member 52. The surface of each of the display elements is divided into a plurality of regions with colors and charging states different from each other and is rotatable in the hollow tube member. The display elements rotate respectively if a drive force such as an electric field or a magnetic field is applied externally, whereby display of an image is realized. The display units are arranged side by side over the entire display region such that they are tangled in a parallel or grid shape. In addition, an electrode plate 53 for providing the drive force is provided externally to complete a display device.

In the above-mentioned conventional technique, it is necessary to connect an external member such as the electrode plate for providing a drive force to each display element. Therefore, the flexibility provided from the structure of aggregating the individual cylindrical display units is lost. In addition, the display device is manufactured by preparing the external member (electrode plate) separately from the device body and then combine them together, hence the manufacturing process being complicated.

SUMMARY OF THE INVENTION

The present invention has been made to solve the above problems. Thus, an object of the invention is to provide a display device of light-receiving (non-emission) type giving natural images, which is easily produced and mechanically flexible.

According to the invention, there is provided a display device comprising conductive fibers as warps each coated with a display medium and transparent conductive fibers as wefts, which are woven together.

The display device according to the invention has a texture similar to that of a plain cloth and nevertheless, it realizes light-receiving type display of natural images, while it is manufactured by a simple method. Thus, a display device having higher flexibility than that of the conventional art is provided, which can be used as a curtain, a wall paper, a wear and the like, with a variety of designs.

BRIEF DESCRIPTION OF THE DRAWINGS

FIG. 1A illustrates a fiber display element while FIG. 1B illustrates schematically a display device comprising such fiber display elements according to an embodiment of the present invention;

DESCRIPTION OF THE PREFERRED EMBODIMENTS

Figure 2:
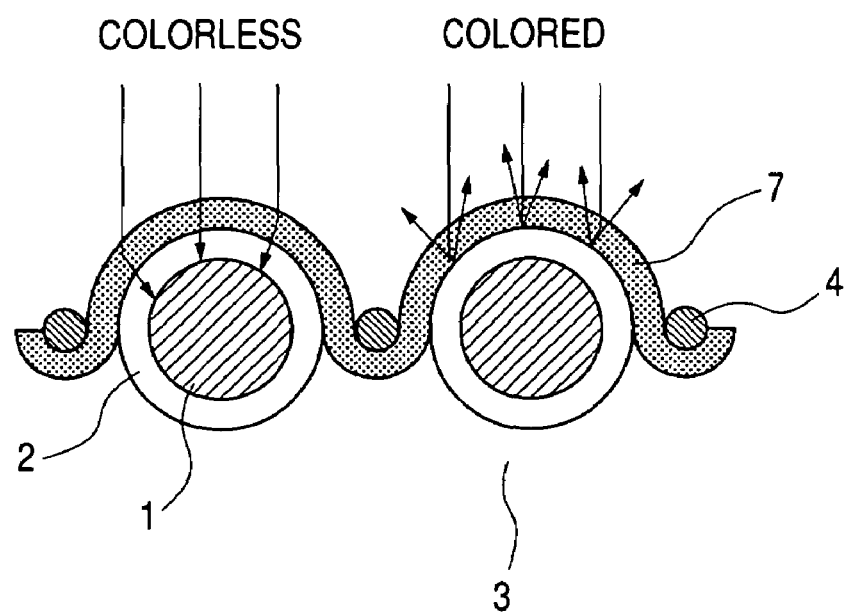
FIG. 2 is a cross sectional view of the display device of FIG. 1B.

FIGS. 1A and 1B are schematic illustrations showing the structure of a sheet display device according to an embodiment of the present invention. FIG. 1A shows a single fiber display element 3 serving as a display element. The display element 3 is a fiber member having a diameter of several tens of μm and composed of an electrode fiber 1 and a polymer layer 2. The electrode fiber 1 penetrates through the center of the display element 3 and is made of a conductive material. The polymer layer 2 is applied to the electrode fiber 1 to coat it. The polymer layer 2 may be formed on the entire circumference of the fiber electrode 1 or alternatively, the polymer layer 2 may be formed on only the portion of the circumference that comes to the display surface side when the display elements 3 are formed into a sheet-shaped display device.

The polymer layer 2 constitutes a display medium of the display device according to the present invention. In this embodiment, the polymer layer 2 is formed of a material which is obtained by dispersing a liquid crystal as droplets into a resin. In the display device, the alignment of liquid crystal molecules in the liquid crystal droplets can be switched between a light scattering state and a light transmitting state by applying an electric field. Such two states are formed by refractive index difference between the two polymers, as typically proposed in JP 2810742 B2. According to the present invention, any combination of polymer materials which can adhere to the circumference of the electrode fiber 1 and can show two light transmission states which can be switched from one state to the other can be used as the display medium.

FIG. 1B shows a sheet display device produced by using the above-mentioned fiber display elements 3. Fiber display elements 3 and insulating fibers 4 are alternately arranged in parallel to compose a warp group 5. Transparent electrode fibers 7 and insulating fibers 6 are also alternately arranged in parallel to compose a weft group 8. The warp group 5 and the weft group 8 are woven together in a cloth weaving manner. As shown in FIG. 1B where the transparent electrode fibers 7 are viewed from the front side, the transparent electrode fibers are woven so as to pass above the fiber display elements 3 and pass under the insulating fibers 4. In contrast to those, the insulating fibers 6 arranged alternately with the transparent electrode fibers 7 pass under the fiber display elements 3 and pass above the insulating fibers 4.

At intersections between the fiber display elements 3 and the transparent electrode fibers 7, the polymer layer 2 of one of the fiber display elements 3 is sandwiched between one of the electrode fibers 1 and one of the transparent electrode fibers 7. Therefore, when a voltage is applied between the particular electrode fiber 1 and the particular transparent electrode fiber 7, an electric field is applied to the polymer layer (more specifically, liquid crystal/polymer complex layer) 2 at the corresponding intersection.

FIG. 2 is a cross sectional view of the sheet along line 2-2 shown in FIG. 1B. The transparent electrode fiber 7 serving as a weft passes between the fiber display element 3 and the insulating fiber 4 serving as a warp.

When an electric field is applied, the molecular orientation of the dispersed liquid crystal in the portion of the polymer layer 2 that is sandwiched between the electrode fiber 1 and the transparent electrode fiber 7 is aligned with the direction of the electric field, so that the difference of refraction index between the liquid crystal and the matrix polymer becomes smaller. Therefore, light incident from the display surface is transmitted through the polymer layer 2 and is absorbed by the electrode fiber 1. That is, a colorless (dark) state is displayed.

On the other hand, the difference of refraction index is large in the portion of the polymer layer 2 where no electric field is applied because the voltage level of the electrode fiber 1 is equal to that of the transparent electrode fiber 7. The light incident on such portion from the display surface is scattered and reflected by the liquid crystal/polymer complex layer, so that a bright state is displayed. Alternatively, if the display fibers are colored, a colored state is displayed.

When a voltage is applied to predetermined intersections of the electrodes of the sheet display device, a predetermined display pattern can be produced correspondingly.

Therefore, in the display device according to the present invention, it is unnecessary to use an external device such as an electrode plate for providing a drive force or an absorption plate that absorbs light transmitting through the liquid crystal polymer/complex layer. In addition, since the fiber elements are arranged and woven together, the same flexibility as plain cloth is obtained in realizing a light receiving type display which is comfortable for eyes are obtained. Further, the display device can be easily manufactured. Since fiber display elements and transparent fiber electrodes are vertically overlapped with each other, insulating fiber elements are woven together between the fiber display elements and the transparent fiber electrodes. Therefore, the fiber display elements and the transparent fiber electrodes are brought into intimate contact to enhance the mechanical strength without losing the flexibility. In addition, the insulating fiber elements have a function of preventing a short circuit between adjacent transparent fiber electrodes and a leakage of electric field between adjacent fiber display elements.

Figure 3:
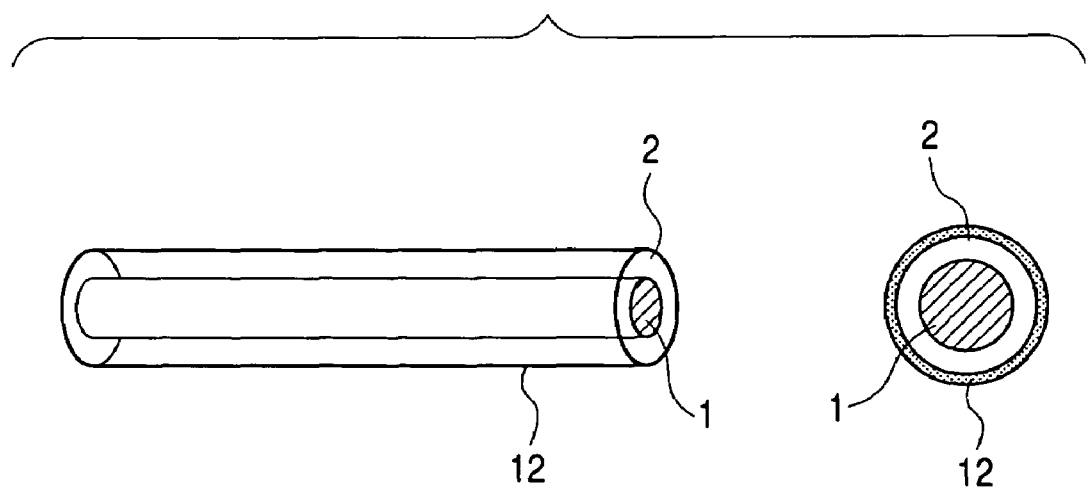
FIG. 3 illustrates a colored fiber display element while FIG. 4 schematically illustrates a color display device comprising such colored fiber display elements according to another embodiment of the present invention.

FIG. 3 shows a color display element to be used in a display device of another embodiment of the present invention. The same reference numerals are provided to the same constitution elements as in FIGS. 1A and 1B. In order to absorb light that is transmitted through the polymer layer 2, it is preferable that the fiber electrode (hereinafter also referred to as an electrode fiber) 1 is a black fiber. Therefore, a graphite electrode or a metallic electrode, which has plasticity and flexibility is preferred. The diameter of the electrode fiber 1 is desirably 10 μm to 2 cm.

A nematic liquid crystal material is preferably used as a liquid crystal material of the polymer layer 2. For example, 2,3-dicyano-4-pentyloxyphenyl-4-(trans-4-ethylcyclohexyl) benzoate is preferably used. In this case, the frequency of an applied voltage is controlled to reversibly change the molecular orientation of the liquid crystal. Therefore, the display state can be reversibly changed between the colored state and the colorless state.

An ultraviolet curable resin is preferably used as a polymer material for dispersing the liquid crystal. In particular, a polymeric compound which is composed of a monofunctional monomer and a polyfunctional monomer is preferable because a memory property can be provided to the alignment of the liquid crystal to provide a memory property to both the colored and colorless orientations. For example, hydroxyalkyl (meth)acrylate as the monofunctional monomer and alkyldiol diglycidyl ether di(meth)acrylate as the polyfunctional monomer can be preferably used.

The polymer layer 2 is formed on the surface of the electrode fiber 1 by performing ultraviolet irradiation simultaneously with or after dip coating or by performing ultraviolet irradiation simultaneously with or after melt spinning. It is desirable that the film thickness of the polymer layer 2 is equal to or smaller than 50 μm, particularly, 5 μm to 15 μm.

A color filter 12 transmits only light having a specific wavelength band and is applied to the surface of the conductive fiber 1. The color filter also has a function of protecting the liquid crystal polymer complex layer 2. A single display element is coated with one of three primary colors. Three-primary-color display elements are arranged to form a pixel, thereby realizing a color display. Note that, instead of the color filter, a liquid crystal layer may be mixed with dichroic molecules to realize a color display.

Figure 4:
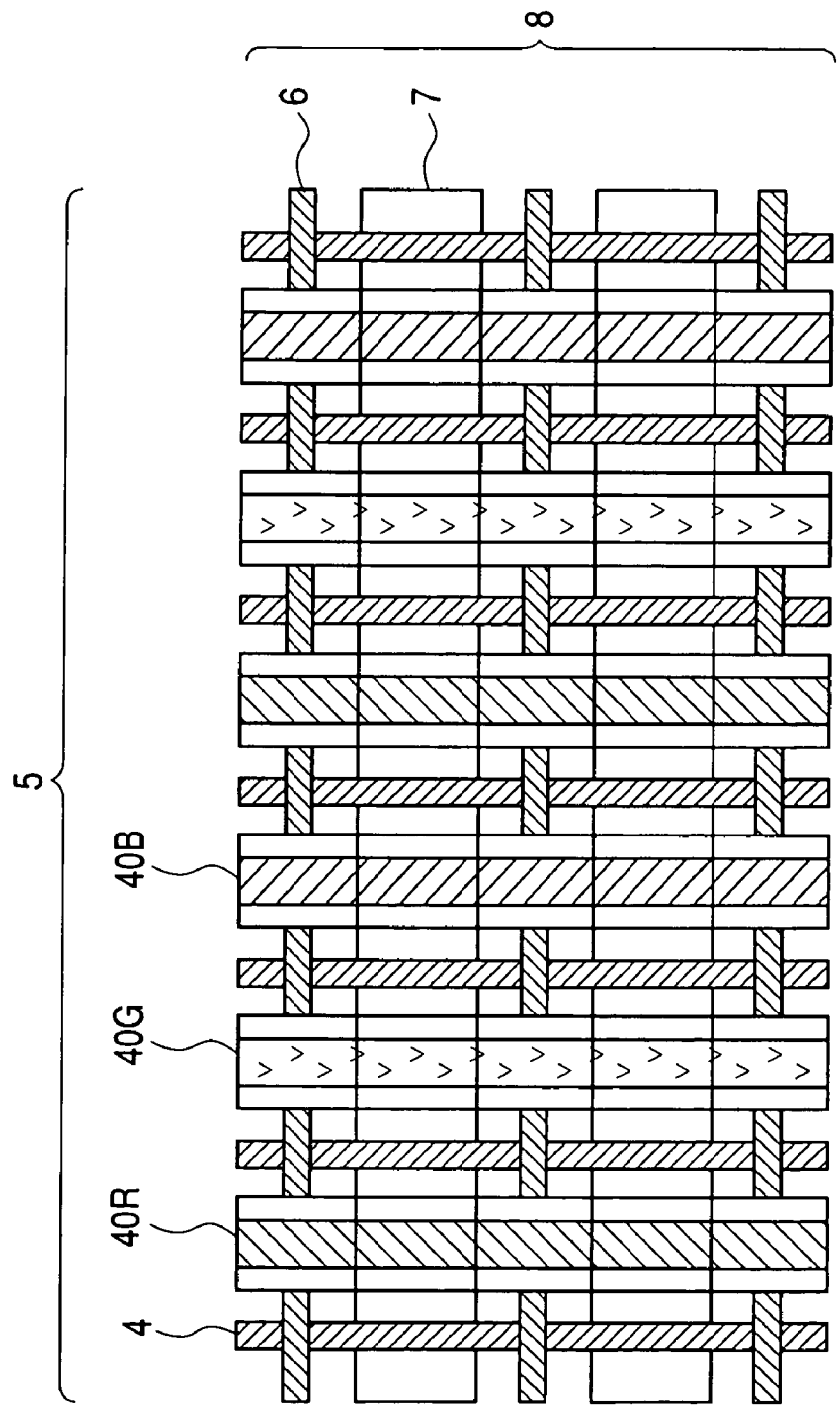
Figure 5:
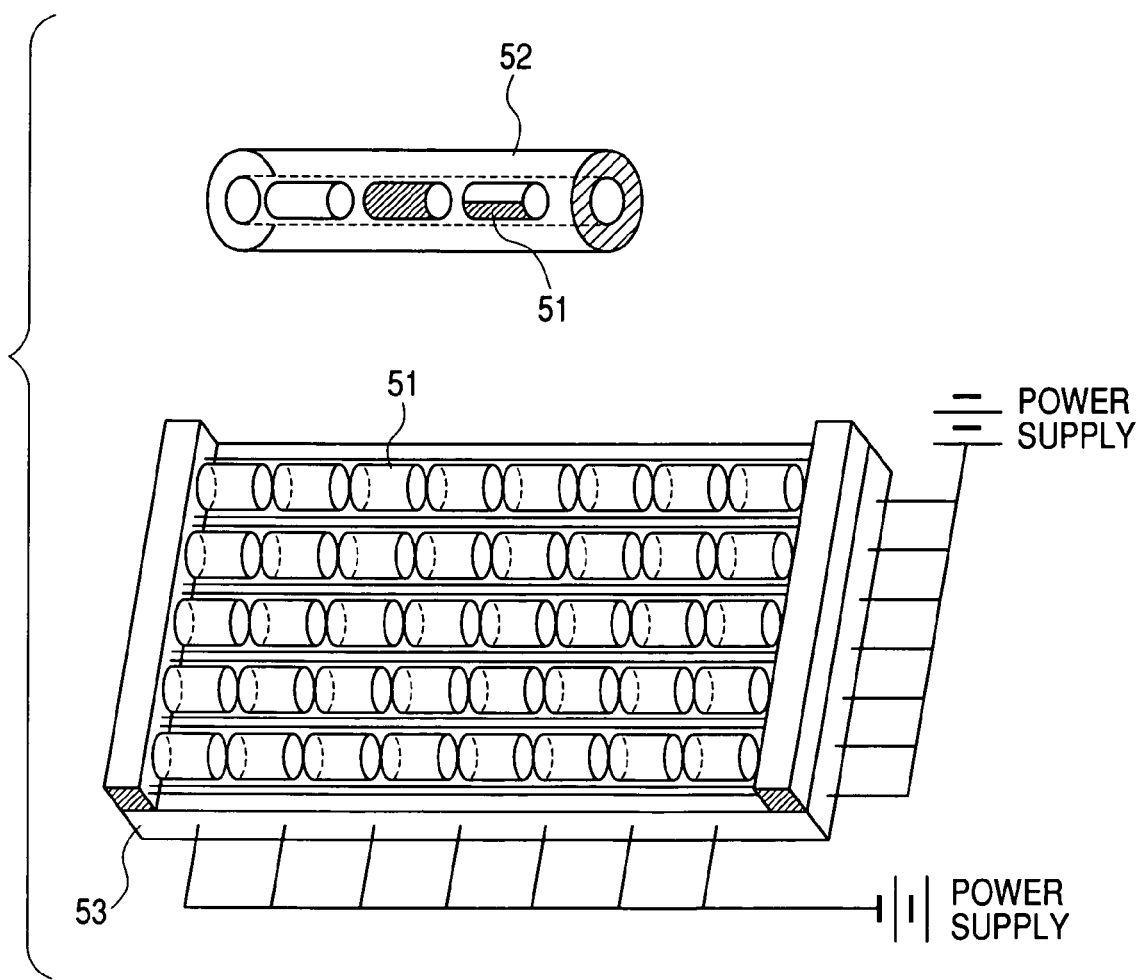
FIG. 5 shows a conventional display device.

FIG. 4 shows a display device according to another embodiment of the present invention.

Color fiber display elements 40R, 40G, and 40B are fiber display elements colored by the above-mentioned method in three primary colors of red, green, and blue, and compose the warp group 5 together with the insulating fibers 4. As in FIG. 1B, the weft group 8 includes the transparent electrode fibers 7 and the insulating fibers 6, which are woven together over the entire display region in a cloth weaving manner.

It is preferable that the diameter of each of the insulating fibers 4 and 6 be equal to or smaller than the diameter of each of the color fiber display elements 40R, 40G, and 40B and the diameter of each of the transparent electrode fibers. An aperture ratio of the display device increases with reduction of the diameter of each insulating fiber. In addition, the insulating fibers are desirably high in flexibility and large in tensile strength so that the mechanical strength of the display device is enhanced while the plasticity thereof is maintained. Accordingly, a polymer such as polyimide or polyvinyl alcohol, which is finished to be a fiber by a melt spinning method is used.

As the transparent electrode fiber 7, for example, a polyester fiber having high plasticity, which is coated with an indium tin oxide thin film is used. The section of the polyester fiber is preferably a plate or may be a circle or an ellipse. A sectional size of the polyester fiber is desirably equal to the size of the display element.

Instead of using the color fiber display elements, three transparent electrode fibers coated with color filters of R, G, and B respectively may be arranged in order. In this case, it is unnecessary to perform color processing on the fiber display elements.

What is claimed is:

1. A display device, comprising:
   a plurality of conductive fibers, each of which is coated with a display medium and serves as a warp;
   a plurality of insulating fibers made of polyimide which are located between the conductive fibers and compose the warps together with the conductive fibers; and
   a plurality of transparent conductive fibers each serving as a weft, wherein the transparent conductive fibers of the wefts and the conductive fibers with the insulating fibers of the warps are woven together so that the transparent conductive fibers of the wefts are located on the display surface side of the conductive fibers of the warps at each intersection.

2. A display device according to claim 1, wherein each of the display mediums coating the warps is colored.

3. A display device according to claim 2, wherein each of the display mediums is coated with a color filter.

4. A display device according to claim 1, wherein the warps coated with the display mediums colored in a plurality of colors are regularly arranged.

5. A display device according to claim 1, further comprising a plurality of insulating fibers, wherein the insulating fibers are located between the transparent conductive fibers and compose the wefts together with the transparent conductive fibers.

6. A display device according to claim 1, wherein each of the display mediums is a polymer layer into which liquid crystal droplets are dispersed.

7. A display device according to claim 1, wherein each of the display mediums is applied to only the display surface side of each of the conductive fibers of the warps.

8. A display device according to claim 1, wherein each of the display mediums is applied to the entire circumference of each of the conductive fibers of the warps.

9. A display device according to claim 1, wherein the conductive fibers of the warps are made of one of graphite or metals.

* * * * *